US012680576B2

(12) United States Patent
Santangelo et al.

(10) Patent No.: US 12,680,576 B2
(45) Date of Patent: Jul. 14, 2026

(54) CAGE FOR ROLLING BEARINGS AND RELATED ROLLING BEARING UNIT

(71) Applicant: Aktiebolaget SKF, Gothenburg (SE)

(72) Inventors: Piero Santangelo, Turin (IT); Enzo Amico, Moncalieri (IT); Riccardo Restivo, Turin (IT); Giuseppe Sardella, Pinerolo (IT)

(73) Assignee: Aktiebolaget SKF, Gothenburg (SE)

( * ) Notice: Subject to any disclaimer, the term of this patent is extended or adjusted under 35 U.S.C. 154(b) by 47 days.

(21) Appl. No.: 18/775,856

(22) Filed: Jul. 17, 2024

(65) Prior Publication Data

US 2025/0043822 A1 Feb. 6, 2025

(30) Foreign Application Priority Data

Aug. 1, 2023 (IT) .......................... 102023000016173

(51) Int. Cl.
F16C 19/06 (2006.01)
F16C 33/38 (2006.01)
(Continued)

(52) U.S. Cl.
CPC .......... F16C 33/3875 (2013.01); F16C 19/06 (2013.01); F16C 33/3806 (2013.01);
(Continued)

(58) Field of Classification Search
CPC .. F16C 19/06; F16C 33/3806; F16C 33/3875; F16C 33/6614; F16C 33/80; F16C 2226/70; F16C 2226/74
See application file for complete search history.

(56) References Cited

U.S. PATENT DOCUMENTS

| | | | | |
|---|---|---|---|---|
| 2,861,849 A | 11/1958 | Case | | |
| 2011/0135234 A1* | 6/2011 | Hosmer | .............. | F16C 33/6614 384/523 |
| 2013/0272638 A1* | 10/2013 | Mola | ................... | F16C 33/7826 384/480 |

FOREIGN PATENT DOCUMENTS

| | | |
|---|---|---|
| AT | 226018 B | 2/1963 |
| DE | 1914884 U | 4/1965 |

(Continued)

OTHER PUBLICATIONS

Examination Report of the National Intellectual Property Office of Italy in Application No. 1102023000016173, dated Feb. 8, 2024; 11pgs.

*Primary Examiner* — Phillip A Johnson
(74) *Attorney, Agent, or Firm* — Stinson LLP

(57) ABSTRACT

A rolling bearing unit (6) includes a rolling bearing (3) and an annular cage (1) formed by two half-cages (10) connected together by pins (16) and holes (18) formed alternately in a row on each half-cage (10). The pins (16) of a half-cage being snap-coupling with the holes (18) of the opposing half-cage. Rigid blocks (21) alternate with recesses (22). The rigid blocks (21) of a half-cage (10) coupling with the recesses (22) of the opposing half-cage (10). The projecting rigid blocks (21) bearing the projecting pins (16). The holes (18) being formed at the back of the recesses (22), so that the half-cages (10) are connected by a first coupling and a second coupling in series (14, 15), designed to separately absorb tangential and axial stresses. The half-cages (10) are provided with a radial annular ridge (34) acting as a screen.

16 Claims, 7 Drawing Sheets

(51) Int. Cl.
 F16C 33/66 (2006.01)
 F16C 33/80 (2006.01)

(52) U.S. Cl.
 CPC .......... F16C 33/6614 (2013.01); F16C 33/80
  (2013.01); *F16C 2226/70* (2013.01); *F16C*
   *2226/74* (2013.01)

(56) References Cited

FOREIGN PATENT DOCUMENTS

| | | | | | |
|---|---|---|---|---|---|
| DE | 102017126701 | A1 | * | 5/2019 | .......... F16C 33/3875 |
| JP | 2007040383 | A | | 2/2007 | |
| JP | 2007113592 | A | | 5/2007 | |
| JP | 2013200007 | A | * | 10/2013 | .......... F16C 33/7893 |
| JP | 2014119030 | A | * | 6/2014 | .......... F16C 33/7893 |
| JP | 2015232400 | A | * | 12/2015 | .......... F16C 33/3875 |
| KR | 1503173 | B1 | * | 3/2015 | |
| WO | 2012085842 | A2 | | 6/2012 | |

* cited by examiner

CAGE FOR ROLLING BEARINGS AND RELATED ROLLING BEARING UNIT

CROSS-REFERENCE TO RELATED APPLICATION

This application claims priority to Italian Application No. 102023000016173, filed Aug. 1, 2023, the entirety of which is hereby incorporated by reference.

FIELD

The present disclosure relates to a cage for rolling bearings and to a related rolling bearing unit, including said cage.

BACKGROUND

A rolling bearing comprising an outer ring, an inner ring and a plurality of rolling bodies (balls) interposed between the rings to make them relatively rotatable with low friction is known from DE1914884U. The rolling bodies are held in the correct position by a cage including:

a plurality of pockets or seats, each delimited by a respective spherical surface having a centre lying in a radial median plane coincident when in use with a corresponding radial median plane of the bearing, two half-cages that are substantially symmetrical about the median plane and that are connected to each other, each half-cage having an annular body and a plurality of at least partially hemispherical cavities axially facing the hemispherical cavities of the opposing half-cage to define the pockets therewith, connection means associated with the half-cages to connect the two half-cages together, for each half-cage, two substantially concentric and circumferentially continuous radial reliefs extending radially in opposite directions from each annular body, the first relief extending radially outwards to sealingly engage a groove formed in the outer ring of the bearing, and the second relief extending radially inwards to sealingly engage a groove formed in the inner ring of the bearing, said inner ring being split into two half-rings that are joined together.

A cage for rolling bearings made of two half-cages that are coupled together to form seats for the balls of the rolling bearing is known from JP2007040383A. The seats are formed by simple circular holes and the related connection means are mating snap-coupling elements in the form of dovetail joints or snap-coupling pins in respective cylindrical seats.

Both of the described solutions have the drawback that the cage, which is formed by coupling the two half-cages together, may not be rigid enough to prevent elastic deformations of the cage when in use caused by variations in the rotational speeds normally applied to rolling bearings when in use.

In DE1914884U, this causes the radial reliefs to move towards or away from the respective grooves as a result of accelerations or decelerations of the bearing. If the reliefs are designed to form a labyrinth seal, they may come into contact with the grooves, resulting in unwanted friction, with related energy consumption, and unwanted heating, or move too far away from the grooves, causing the seal to fail.

Similarly, if the reliefs are designed to form a contact seal in the grooves, increased interference or loss of interference may have the same negative consequences.

In JP2007040383A, which does not provide for sealing reliefs, the unwanted elastic dimensional variations of the cage may nonetheless make the holding and guiding action exerted by the cage on the balls (or other rolling bodies) of the bearing less effective or ineffective.

Finally, in the known rolling bearings described above, a significant part of the lubricating grease remains "stuck" to the shields and therefore does not contribute to lubrication of the bearing.

SUMMARY

The present disclosure is intended to overcome the drawbacks in the prior art, and in particular to provide a cage that enables the rolling bodies to be held in a correct position at all times, thereby eliminating possible noise when in use, and that is simultaneously able to create a seal both against external contaminants to protect the rolling bodies, and for the lubricating grease contained in the rolling bearing between the inner and outer rings, all of which is intended to reduce or eliminate the risk of friction, or at least excessive friction, between the cage and the rolling bearing.

Another objective of the present disclosure is to optimize the quantity and position of the lubricating grease inside the bearing, not only to prevent grease leakage (i.e. the leakage of a part, albeit a small part, of the lubricant out of the bearing), but also to reduce losses of lubricating grease by "splashing", and in particular to use all of the lubricating grease to lubricate the raceways, thereby potentially reducing the quantity of lubricating grease required while keeping the lifetime lubrication of the bearing unchanged.

A final objective of the present disclosure is to provide a rolling bearing unit including such a cage that is designed to provide a good seal with low friction between the cage and the rings of the rolling bearing.

The present disclosure therefore provides a cage for holding the rolling bodies in a rolling bearing, and a related rolling bearing unit, as defined in the attached claims.

In particular, the present disclosure is based on increasing the rigidity of the cage obtained by coupling the two half-cages without increasing the size and weight thereof, which would adversely affect the number of rolling bodies that can be inserted in the cage and/or the quantity of lubricating grease available to the rolling bodies.

BRIEF DESCRIPTION OF THE DRAWINGS

Further features and advantages of the present disclosure are set out more clearly in the following description of non-limiting embodiments thereof, provided with reference to the figures in the attached drawings, in which.

DETAILED DESCRIPTION

Figure 1:
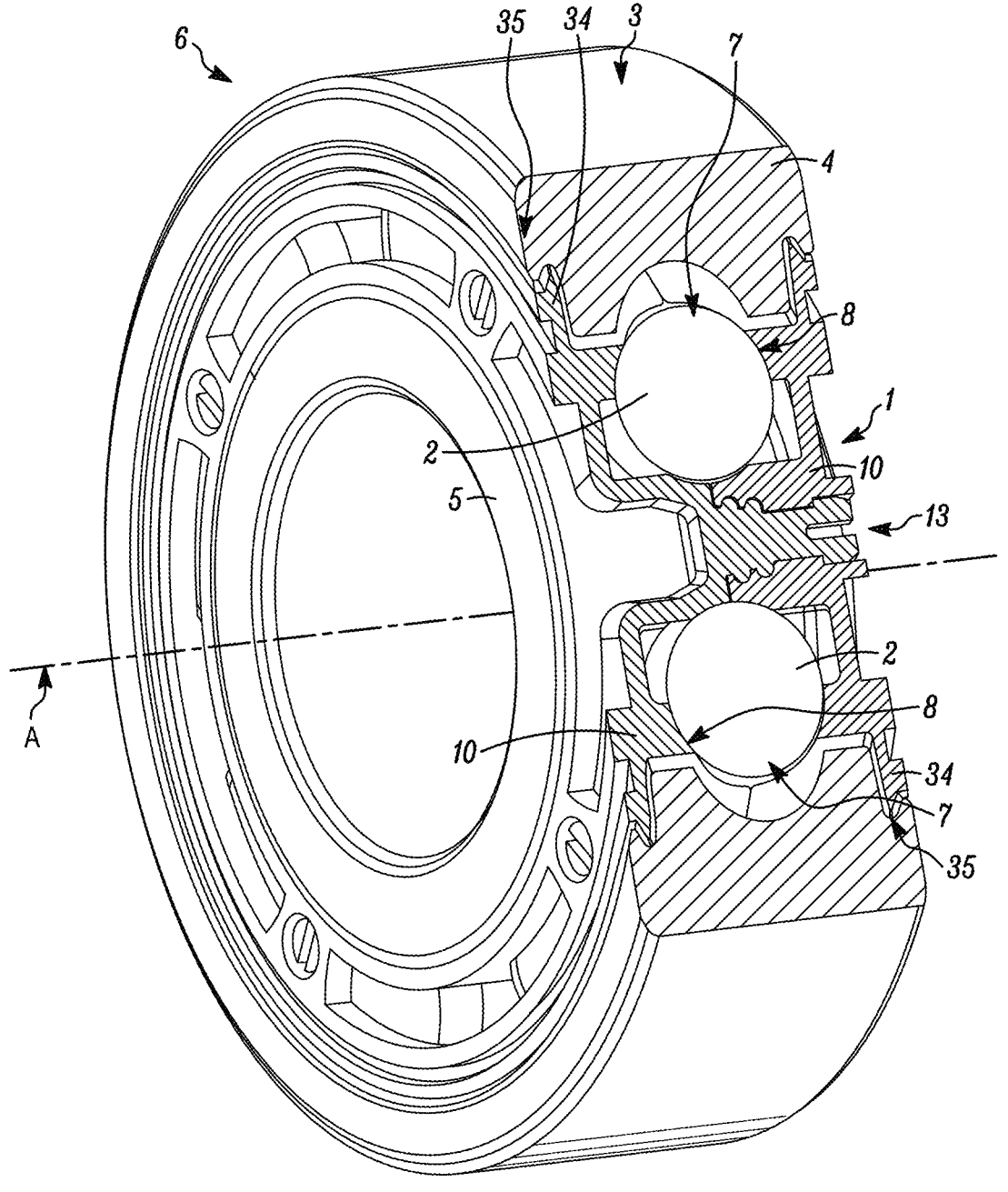
FIG. 1 is a partially cut-away schematic perspective three-quarter side view of a rolling bearing unit according to the present disclosure, comprising, in the non-limiting example illustrated, a rolling bearing with a single row of rolling bodies, shown as balls in the non-limiting illustration, and a cage for holding the rolling bodies according to a first embodiment of the present disclosure.
Figure 2:
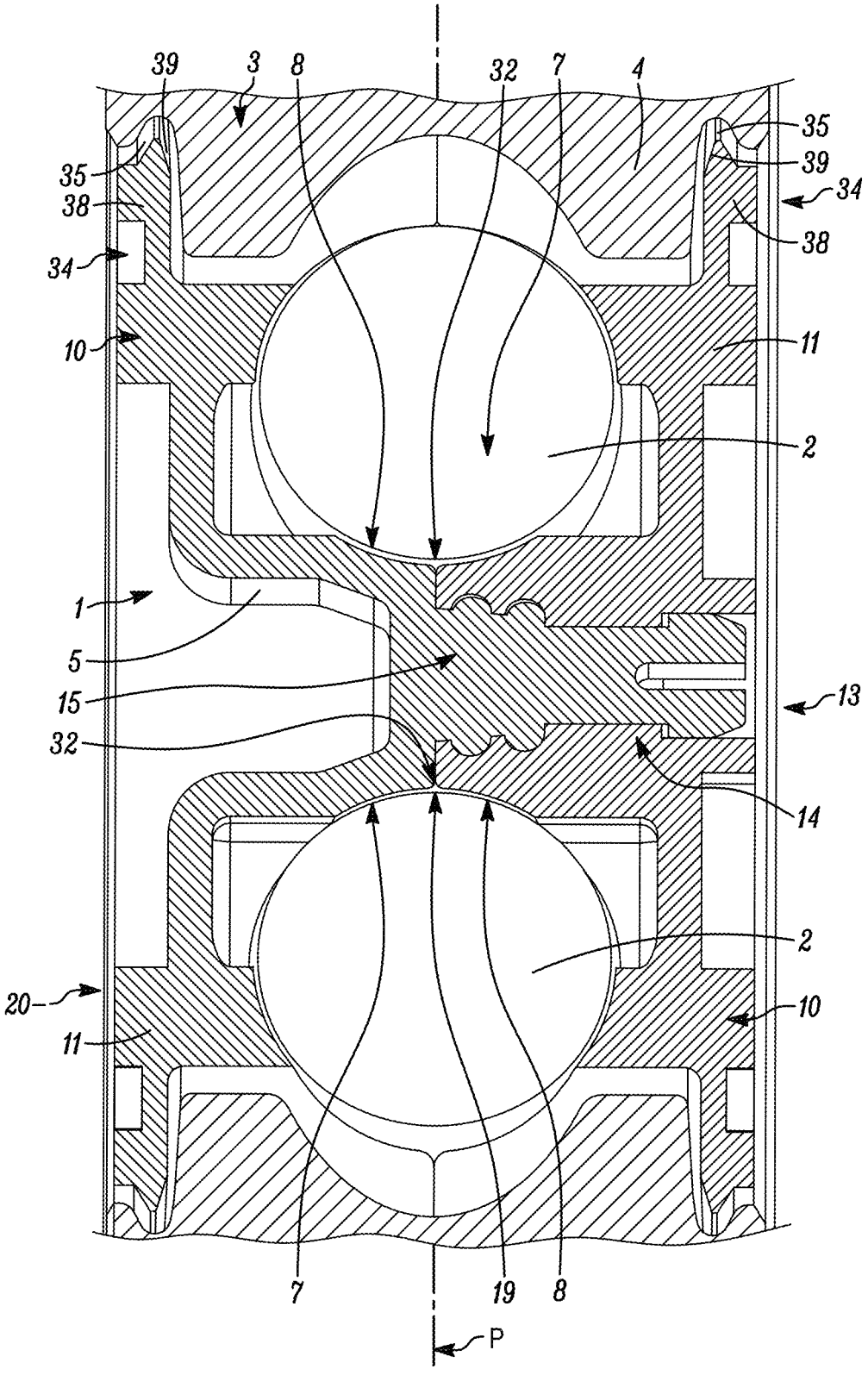
FIG. 2 is a magnified schematic circumferential cross-section view of a detail in FIG. 1.

In FIGS. 1 to 7, reference sign 1 indicates, as a whole, a cage for holding rolling bodies 2 in a rolling bearing 3.

The rolling bearing 3 comprises an outer ring 4, an inner ring 5, and a plurality of rolling bodies 2 interposed between the outer ring 4 and the inner ring 5 to make them relatively rotatable with low friction, and forms a rolling bearing unit 6 with the cage 1 interposed between the outer ring 4 and the inner ring 5.

The cage 1 is therefore designed to be interposed between the respective inner ring 5 and outer ring 4 of the rolling bearing 3 when in use to hold, in a known manner, the rolling bodies 2 in the correct position between the rings 4 and 5, with the desired pitch between the rolling bodies 2, which are balls in the non-limiting example illustrated.

The annular cage 1 has an axis of symmetry A that is coincident when in use with the axis of symmetry of the rolling bearing 3, and is also the axis of symmetry of the rolling bearing unit 6. The axis A is also the axis of relative rotation between the rings 4 and 5.

The cage 1 comprises a plurality of radial through-seats or pockets 7 disposed in a row, each being designed to seat a respective rolling body 2.

Each of the radial through-seats or pockets 7 is delimited, in the illustrated preferred embodiment in which the rolling bodies 2 are balls, by a respective spherical surface 8 (FIGS. 1 and 2) having a centre lying in a radial median plane P of the cage 1 that is coincident when in use with a corresponding radial median plane of the rolling bearing 3. The geometric outline of the median plane P is illustrated schematically in FIGS. 2 and 3.

According to one aspect of the present disclosure, the annular cage 1 comprises two axially opposing annular half-cages 10 that are substantially symmetrical about the median plane P and rigidly connected together, as detailed below, to form, once coupled together, a cage 1 that acts as if substantially formed as a single part.

The two half-cages 10, which are identical and therefore indicated using the same reference number, are made by moulding a suitable synthetic plastic material, for example a polyamide, and have an identical axis of symmetry A along which they are coupled frontally to form the cage 1.

Each half-cage 10 has an annular body 11 with the axis A as axis of symmetry, and a plurality of cavities 12, which are at least partially hemispherical in the preferred embodiment illustrated. The cavities 12 are indeed delimited at least partially, or fully, by a respective portion of the spherical surface 8 of each pocket or seat 7.

Once the half-cages 10 are coupled in the axial direction, the at least partially hemispherical cavities 12 of each half-cage 10 axially face the hemispherical cavities 12 of the opposing half-cage 10, such as to define therewith the seats or pockets 7 delimited by the spherical surface 8.

The annular cage 1 further comprises connection elements between the two half-cages 10, indicated as a whole and generically with reference number 13, that are designed to rigidly connect the two opposing half-cages 10 together to form the annular cage 1, as if this were a one-piece part.

According to a first aspect of the present disclosure, the connection elements 13 are designed to connect the half-cages 10 with a first mechanical coupling 14 and a second mechanical coupling 15 (FIG. 2) that are disposed axially in series with one another and designed to respectively and separately absorb axial stresses and tangential stresses to which the cage 1 is subjected when in use.

In particular, the first mechanical coupling 14 is formed by a plurality of first pairs of mating connection elements 16, 18 (FIGS. 5-7) comprising, for each first pair of connection elements 13 forming the mechanical connection 14, a pin 16 that is at least partially elastically deformable and a respective hole 18 designed to receive the pin 16 by snap-coupling.

Each half-cage 10 is then provided with a plurality of pins 16 that project axially from the annular body 11 on the side of a first front face 19 (FIGS. 2 and 6) of the annular body 11, and a corresponding plurality of holes 18 formed axially in the annular body 11 on the side of a second front face 20 (FIGS. 2 and 5) of the annular body 11 opposite the first face 19.

The annular body 11 of each half-cage 10 is thus provided with holes 18 and pins 16. The pins 16 and the holes 18 are provided in equal numbers and preferably disposed alternately in a row, in any case so that when two half-cages 10 are coupled frontally in the axial direction, each pin 16 of a half-cage 10 is coupled with a facing hole 18 in the opposing half-cage 10, in particular through an opening of the hole 18 facing the first face 19. The holes 18 are preferably through-holes that open into the face 20.

According to an important aspect of the present disclosure, the second mechanical coupling 15 is formed by a plurality of second pairs of mating connection elements 21, 22 comprising (FIGS. 4, 6 and 7), for each second pair forming the mechanical connection 15, a male element 21 in the form of a substantially rigid solid block integral with the annular body 11 that projects axially from the first front face 19 of the annular body 11 of each half-cage 10, and a corresponding recess 22 designed to be rigidly coupled to the solid block 21 forming the male element, the recess 22 being formed in the annular body 11 through the first front face 19 of the annular body 11 of each half-cage 10.

Again in this case, each half-cage 10 is provided with a plurality of male elements formed as rigid solid blocks 21 and a corresponding plurality of recesses 22, preferably disposed alternately with one another in a row so that each male element 21 of a half-cage 10 is coupled with a facing recess 22 in the opposing half-cage 10.

According to another fundamental aspect of the present disclosure, to form the couplings 14, 15 disposed in series in the axial direction, each pin 16 projects axially from a corresponding male element 21 formed by a solid block, so as to be disposed axially in series with the latter and downstream thereof with respect to the position of the first front face 19 of the annular body 11 of each half-cage 10.

Similarly, each recess 22 is disposed axially in series with one such respective hole 18, upstream thereof with respect to the position of the first front face 19 of the annular body 11 of each half-cage 10.

By selecting a specific type of connection element 16, 18 and 21, 22 and a specific relative position thereof, the mating connection elements 21, 22 of the second pair of connection elements 13 forming the mechanical connection 15 are designed to receive tangential components of mechanical stresses applied to the annular cage 1 when in use, while the mating connection elements 16, 18 of the first pair of connection elements 13 forming the mechanical connection 14 are designed to receive axial components of said mechanical stresses and to keep the half-cages 10 in contact with one another, with the respective front faces 19 disposed in axial abutment against one another.

According to a preferred aspect of the present disclosure, each solid block of moulded polymer material forming the male element 21 of the second pairs of mating connection elements 13 is wedge-shaped, and is preferably a truncated pyramid with a rectangular or square base, as is each corresponding recess 22, so that each solid block 21 is coupled to the corresponding recess 22 via surfaces 23 (FIG. 6) disposed obliquely to the shared axis of symmetry A of the opposing half-cages 10. The oblique surfaces 23 face one another in pairs, either (wedge-shaped) in the circumferential direction or in the radial direction, or (truncated pyramid shape) in both directions.

According to a preferred embodiment of the present disclosure (FIG. 6), each solid block 21 forming a male element of the second pairs of mating connection elements 23 is provided laterally in a circumferential direction with respective radial teeth or reliefs 24 designed to snap-couple with respective radial grooves 25 formed inside each recess 22.

Obviously, according to a possible variant, which for the sake of simplicity is not illustrated, the alternate arrangement may be used, in which the radial grooves 25 are formed laterally in the solid blocks forming the male elements 21 and the radial teeth or reliefs 24 project circumferentially in the recesses 22.

Also obviously, the possible oblique surfaces disposed to face one another in the circumferential direction of the solid blocks 21 and the recesses 22 may or may not be provided with teeth 24 and grooves 25, or vice versa.

According to another aspect of the present disclosure, each at least partially hemispherical cavity 12 of each half-cage 10 is delimited on the respective opposing circumferential sides thereof by a first axial lug and a second axial lug, indicated respectively with reference numbers 26 and 27 (FIGS. 4 and 6), that are disposed adjacent to one another and that project axially from the annular body 11 from each half-cage 10 from the side of the front face 19.

Each axial lug 26 in turn bears a male element made up of a solid block 21 and a pin 16 on top of the male element or block 21, arranged to project axially in series away from the faces 19.

Each axial lug 27 is on the other hand formed such as to be internally hollow and delimits a respective internal recess 22 therein. A respective hole 18 leads axially from the inside of each recess 22 away from the face 19, through the respective annular body 11, then through the second front face 20.

In the embodiment in which the connection elements 13 include the grooves 25 and the related teeth or reliefs 24 (FIGS. 3 and 6), the opposing circumferential sides of respective adjacent pairs of cavities 12 of the annular body 11 of each half-cage 10 flank respective opposing side walls 23 of each recess 22 provided with the radial grooves 25.

The latter are designed to snap-couple circumferentially with the radial teeth or reliefs 24 of the male elements 21. As mentioned above, according to a possible variant, the radial teeth or reliefs 24 are formed on the opposing side walls 23 of each recess 22 and are designed to snap-couple circumferentially with the radial grooves 25, in this case formed on the opposing sides of the male elements 21 disposed in the circumferential direction.

According to another important aspect of the present disclosure, each cavity 12 of the annular body 11 of each half-cage 10 is delimited axially, towards the second front face 20 of the annular body 11, by a back wall, which is spherical in the illustrated example, defined by a portion of the spherical surface 8.

This back wall 8 is provided, towards the first front face 19 of the annular body 11, with a depression 29 (FIGS. 3, 4 and 6) having an axial depth towards the second front face 20 and a circumferential extension, to create a lubricating grease containment chamber so that, when in use and when the half-cages 10 are axially coupled, respective opposing sides of each seat or pocket 7 for the rolling bodies 2 are delimited by opposing lubricating grease containment chambers defined by the depressions 29, which are therefore in direct contact with the rolling bodies 2, and furthermore at a primitive or median diameter of the rolling bearing 3.

This optimizes distribution of the lubricating grease on the rolling bodies 2 when in use, in particular when said rolling bodies are balls, as in the preferred example embodiments illustrated.

According to another aspect of the present disclosure, the spherical back wall 8 of each at least partially hemispherical cavity 12 is provided (FIG. 4) with a pair of radial grooves 30 that are parallel to one another and disposed close to the opposing circumferential sides of the cavity 12 delimited by the/delimiting the axial lugs 26, 27. The grooves 30 pass through the depression 29 in the same cavity 12 in which the grooves are located, and are therefore interrupted by the depression 29 so as to be in hydraulic communication therewith.

The grooves 30 are therefore designed to enable the circulation, when in use, of the lubricating grease in each seat or pocket 7 for the rolling bodies 2.

In combination with this feature, the opposing circumferential sides of each at least partially hemispherical cavity 12 are delimited, on the side of the first front face 19 of the annular body 11, by opposing chamfers 31 (FIG. 4) designed to form, when the half-cages 10 are axially coupled, opposing curved radial channels 32 (FIG. 2) for the circulation of lubricating grease that are disposed about the periphery of each seat or pocket 7 for the rolling bodies 2.

According to a highly preferred aspect of the present disclosure, each half-cage 10 is provided radially on the outside with a substantially flange-shaped first radial annular ridge 34 formed near to the second front face 20 of the annular body of each half-cage, so as to be axially distal from the seats or pockets 7 for the rolling bodies 2.

The radial annular ridge 34 of each half-cage 10 is designed to be coupled in use (FIGS. 1-3) in an annular slot 35 formed radially inside the outer ring 4 of the rolling bearing 3 to create a labyrinth seal therewith, which is known as a whole.

Figure 3:
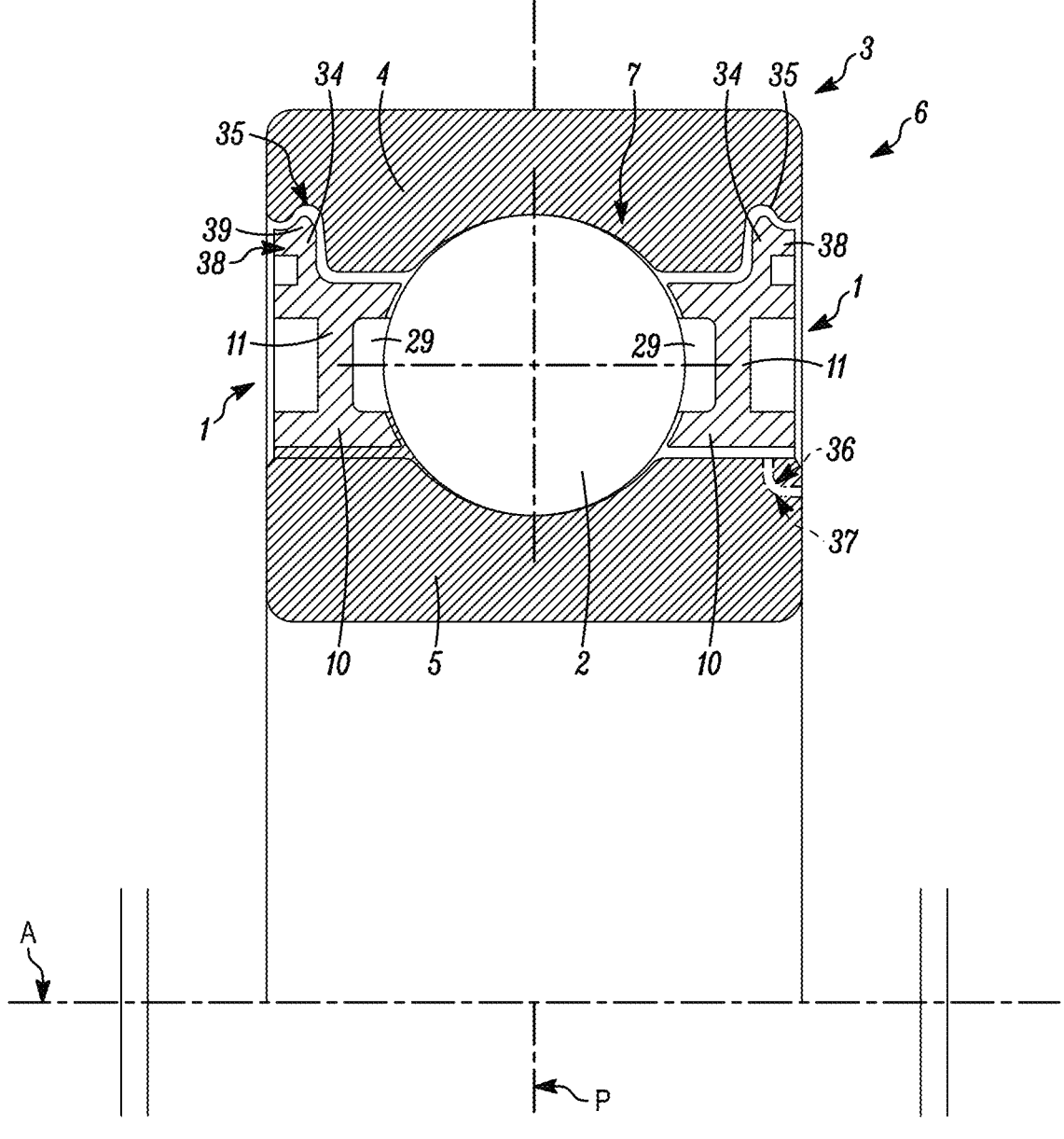
FIG. 3 is a slightly magnified schematic radial cross-section view of a bearing unit and of the related cage for the rolling bodies, according to the first embodiment of the present disclosure in FIG. 1, and according to a possible variant thereof, shown for the sake of simplicity and greater clarity using hatching only.
Figure 4:
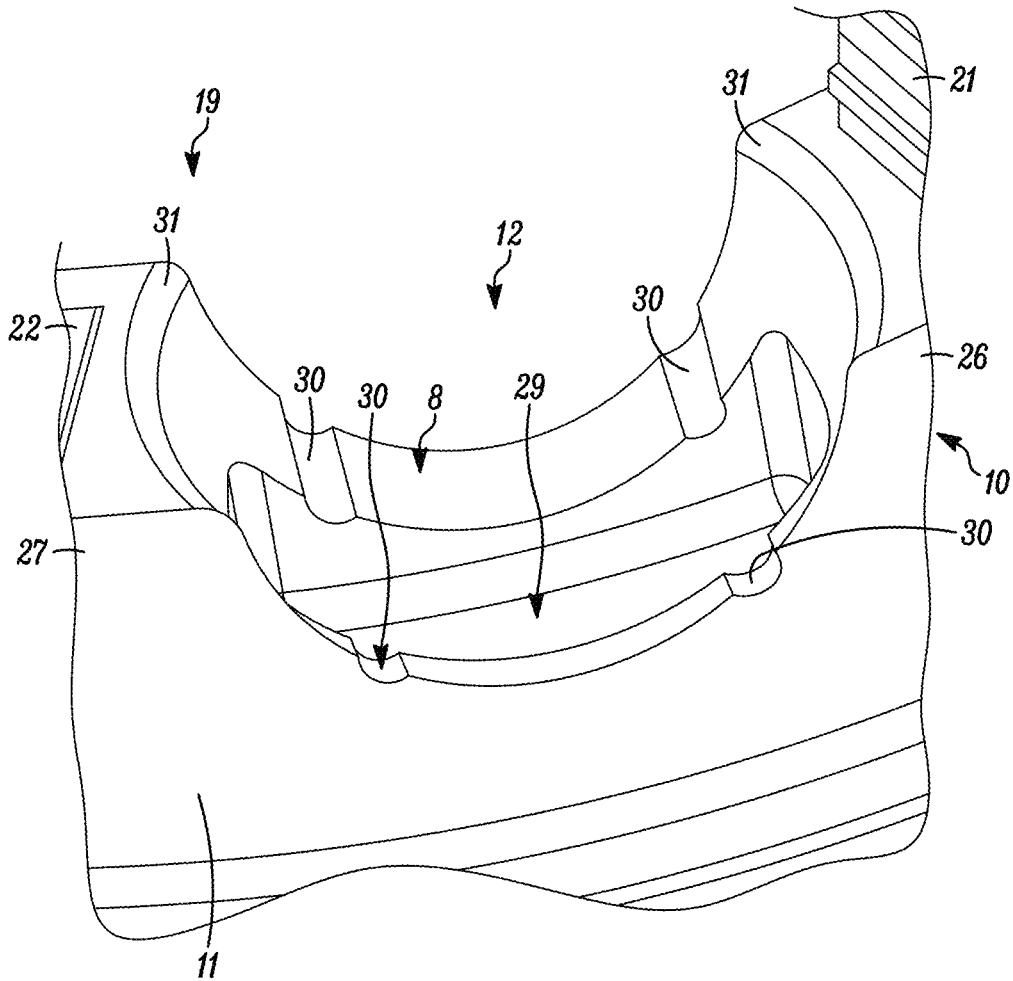
FIG. 4 is a schematic magnified perspective view of a circumferential section of an axially inner front annular face of an annular half-cage belonging to the cage for holding the rolling bodies in FIGS. 1 and 2, said circumferential section being rotated through 90° for the sake of clarity to show said axially inner front annular face of the half-cage at the top of the figure, said front annular face facing the rolling bodies of the rolling bearing in FIG. 1 when in use.
Figure 5:
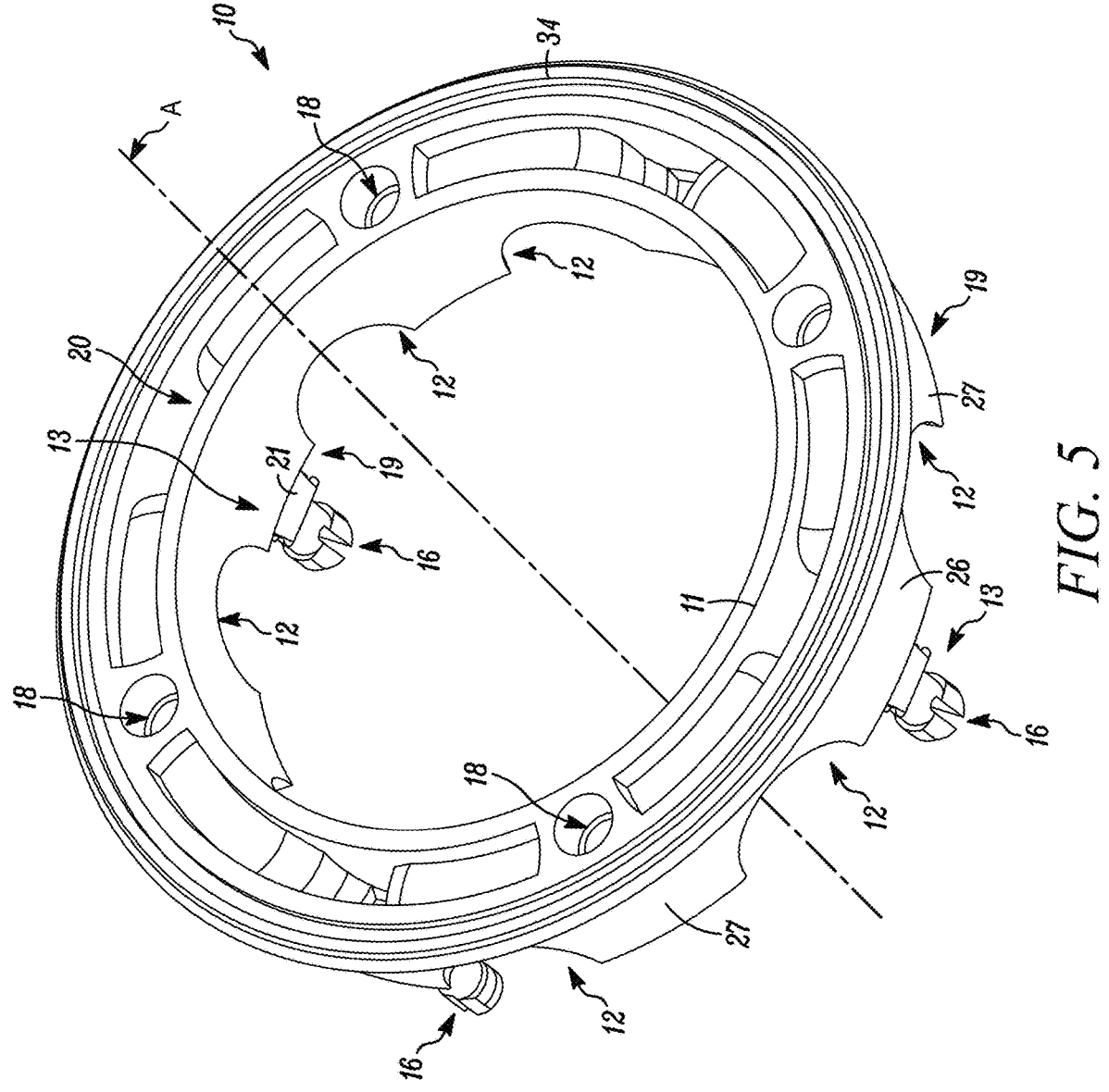
FIGS. 5 and 6 are corresponding schematic perspective views of two components of the cage for holding the rolling bodies of the bearing in FIG. 1, comprising two identical half-cages that are coupled together frontally in an axial direction to form the cage in FIGS. 1 and 2, the half-cage in FIG. 5 being illustrated with a front face thereof facing in the opposite direction to the same front face of the half-cage shown in FIG. 6.
Figure 6:
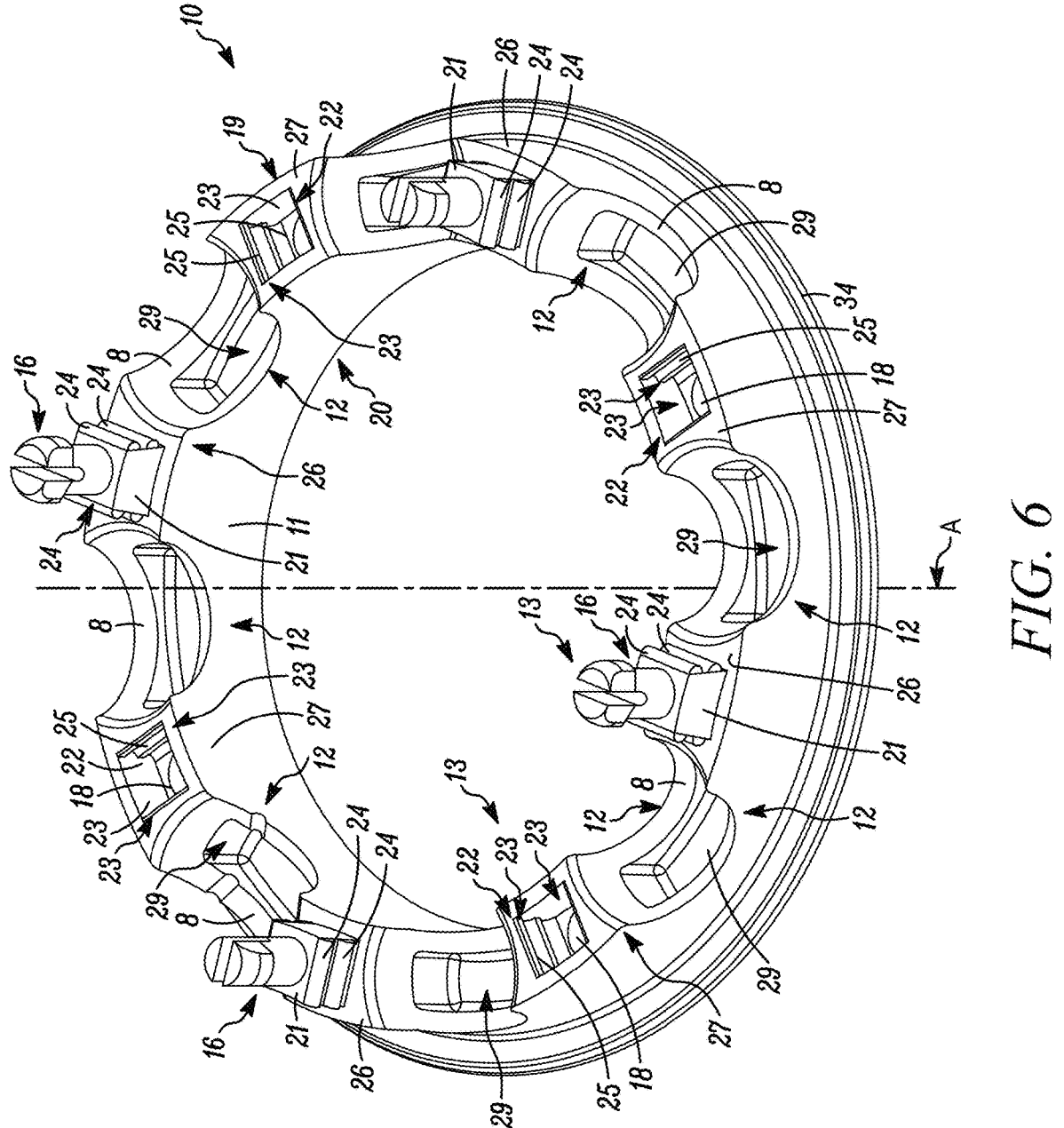
Figure 7:
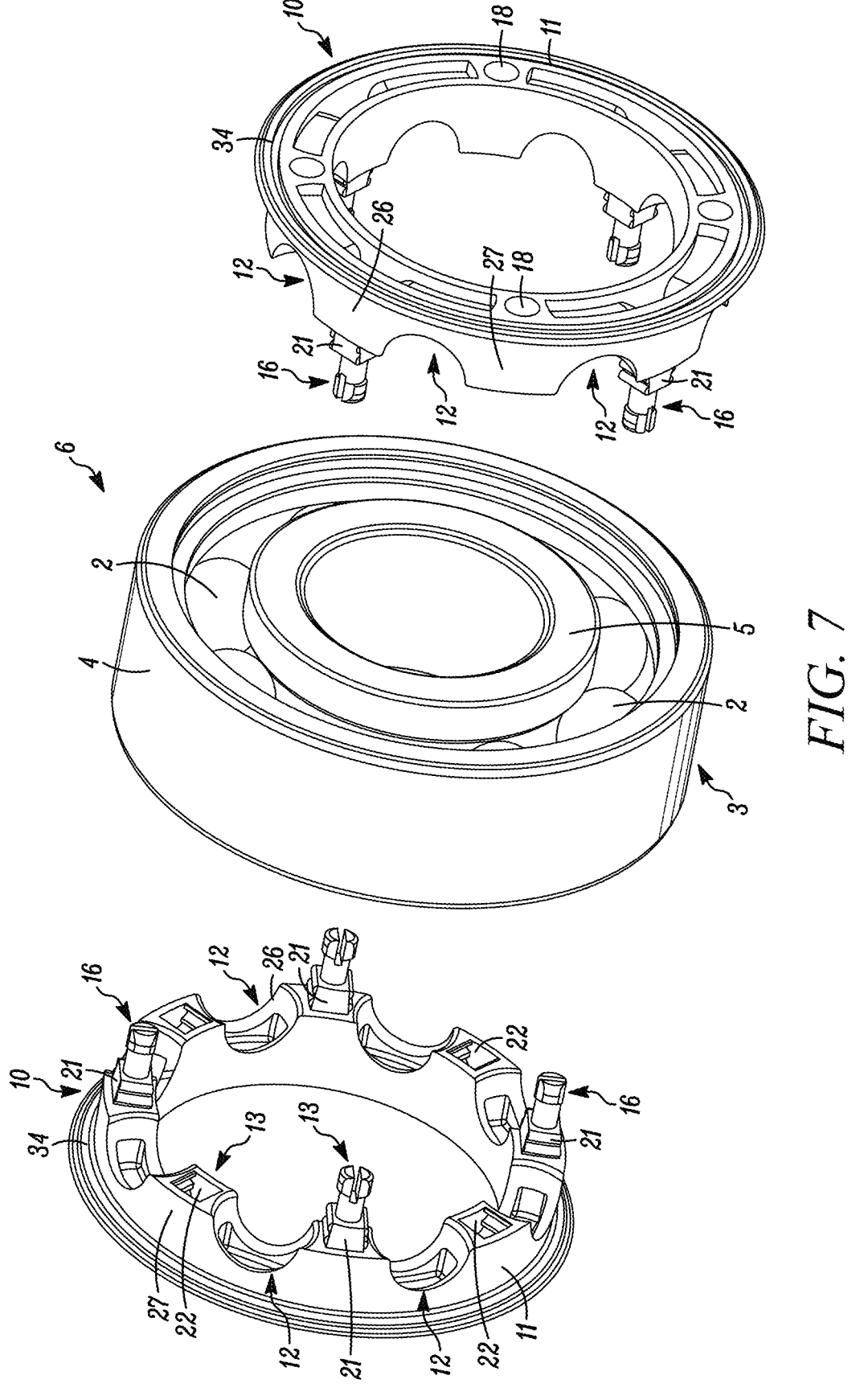
FIG. 7 is an axially exploded perspective view of the rolling bearing unit in FIGS. 1-3.

In a possible embodiment, illustrated schematically using hatching in FIG. 3 for the sake of simplicity, a second radial annular ridge 36 is optionally formed radially on the inside of each half-cage 10, substantially flush with the first radial annular ridge 34, and is designed to be coupled in use in a second annular slot 37 formed radially on the outside of the inner ring 5 of the rolling bearing 3, also to create a labyrinth seal therewith, which is known as a whole.

However, both to improve the action of the labyrinth seal and to simplify and compact the structure of the half-cages 10, the radial annular ridge 34 (FIGS. 2 and 3) is provided radially on the outside of an axial relief 38. The axial relief 38 is formed radially on the inside of a radially outer peripheral edge 39 of the annular ridge 34 so as to be remote from the edge 39. The edge 39 preferably has a curved profile in radial section, mating with a corresponding curved profile of the annular slot 35.

On the basis of the foregoing, the scope of the present disclosure clearly includes a rolling bearing unit 6 comprising a rolling bearing 3 in turn comprising an outer ring 4, an inner ring 5 and a plurality of rolling bodies 2 interposed between the inner ring 5 and the outer ring 4 to make them relatively rotatable with each other with low friction, and an annular cage 1 for holding the rolling bodies 2 and interposed between the inner ring 5 and the outer ring 4.

The annular cage 1 comprises a plurality of pockets 7 each delimited by a respective spherical surface 8 having a centre lying in a radial median plane P of the cage 1 coincident with a corresponding radial median plane of the rolling bearing 3.

The cage 1 is furthermore formed by joining two half-cages 10 that are substantially symmetrical about the median plane P and connected together axially.

Each half-cage 10 has an annular body 11 and a plurality of at least partially hemispherical cavities 12 axially facing the hemispherical cavities 12 of the opposing half-cage 10 so as to define the pockets 7 therewith. The cage 1 further comprises connection elements 13 associated with the half-cages 10 to connect the two half-cages 10 together to form the annular cage 1.

These connection elements 13 comprise, in combination:

(i) first pairs of mating connecting elements consisting, for each first pair, of a pin 16 that is at least partially elastically deformable and a respective hole 18 designed to receive the pin 16 by snap-coupling, each half-cage 10 being provided with a plurality of such pins 16 projecting axially from the annular body 11 on the side of a first front face 19 of the annular body 11, and a corresponding plurality of holes 18 formed axially in the annular body 11 on the side of a second front face 20 thereof opposite the first face 19, the annular body 11 of each half-cage 10 being provided with both the holes 18 and the pins 16, which are disposed alternately with one another in a row so that each pin 16 of a half-cage 10 is coupled with a facing hole 18 in the opposing half-cage 10 through an opening of the hole 18 facing the first face 19.

In combination with the foregoing, the connection elements 13 also comprise second pairs of mating connection elements comprising, for each second pair, a male element 21 designed as a substantially rigid solid block that projects axially from the first front face 19 of the annular body 11 of each half-cage 10, and a corresponding recess 22 designed to be rigidly coupled to the solid block 21 forming the male element, the recess 22 being formed through the first front face 19 of the annular body 11 of each half-cage 10.

Each half-cage 10 is provided with a plurality of male elements 21 and a corresponding plurality of recesses 22, disposed alternately with one another in a row so that each male element 21 of a half-cage 10 is coupled with a facing recess 22 in the opposing half-cage 10.

Each pin 16 projects axially from a corresponding male element formed by a solid block 21, so as to be disposed axially in series with the latter and downstream thereof with respect to the first front face 19 of the annular body 11 of each half-cage 10.

Each recess 22 is also disposed axially in series with a respective hole 18, upstream thereof with respect to the first front face 19 of each half-cage 10.

Finally, each half-cage 10 that is part of the rolling bearing unit 6 is provided radially on the outside with a substantially flange-shaped first radial annular ridge 34 formed near to the second front face 20 of the annular body 11 of each half-cage 10, so as to be axially distal from the seats or pockets 7 for the rolling bodies 2.

The radial annular ridge 34 of each half-cage 10 is coupled in an annular groove 35 formed radially inside the outer ring 4 of the rolling bearing 3 to create a labyrinth seal therewith. A second radial annular ridge 36 is optionally formed radially on the inside of each half-cage 10, substantially flush with the first radial annular ridge 34, and is coupled in a second annular slot 37 optionally formed radially on the outside of the inner ring 5 of the rolling bearing 3, to create a labyrinth seal therewith.

On the basis of the foregoing, it is clear that, while known rolling bearings include one or two shields to prevent foreign dust particles from entering the bearing and to prevent grease losses, the described solution replaces the conventional shields with a symmetrical cage 1 having an additional shielding function. A lesser quantity of grease can also be held in the bearing as a result of the special configuration in the design of the pockets 7, which have a volume available for lubricating grease that is constant and easily adjustable during the design phase of the cage, and in particular in direct contact with the rolling bodies, on account of the presence and position of the depressions 29.

Being formed on pairs of respective adjacent axial lugs 26 and 27, the male element 21 coupled to the female cavity 22 withstands the tangential force when the cage accelerates and decelerates as a result of the acceleration or deceleration of the bearing, obviating unwanted and/or excessive deformations of the cage 1, thereby keeping the sealing action of the annular ridges 34 and 36 (where present) in an optimal state with no friction (or with reduced friction). The pins 16 snap-coupled in a known manner in the holes 18 block the half-cages 10 axially.

All of the objectives of the present disclosure are thus achieved.

What is claimed is:

1. An annular cage for retaining rolling bodies in a rolling bearing, configured to be in use mounted interposed between respective inner and outer rings of the rolling bearing and comprising a plurality of radially passing-through seats or pockets arranged in a row with respect to one another and each configured to accommodate a respective rolling body, said plurality of radially passing-through seats or pockets being bounded, each, by a respective spherical surface having a center lying in a radial median plane of the cage coincident in use with a corresponding radial median plane of the rolling bearing, the annular cage comprising:

two axially opposite and essentially symmetrical half-cages in relation to the median plane, connected with each other, each half-cage presenting an annular body and a plurality of at least partially hemispherical cavities facing axially the hemispherical cavities of the opposite half-cage, to define with the latter said seats or pockets; and connection elements to constrain together the two oppos-
ing half-cages to form jointly said annular cage, the
connection elements include, in combination:

first pairs of conjugate connection elements consisting,
for each first pair, of a pin at least partially elastically
deformable and a respective hole configured to snap-
pingly receive the pin, each half-cage being provided
with a plurality of said pins projecting axially from
the annular body on the side of a first frontal face of
the annular body and of a corresponding plurality of
holes obtained axially in the annular body on the side
of a second frontal face thereof, opposite to the first
frontal face, the annular body of each half-cage being
provided with said holes and said pins that are so
arranged that each pin of said half-cage mates with
the hole facing said pin of the opposite half-cage
through an opening of the hole facing the first frontal
face; and second pairs of conjugate connection elements consist-
ing, for each second pair, of a male element config-
ured as a substantially rigid, solid block projecting
axially from the first frontal face of the annular body
of each half-cage, and of a corresponding recess
configured to mate in integral manner with the solid
block constituting the male element, the recess being
obtained through the first frontal face of the annular
body of each half-cage; each half-cage being pro-
vided with a plurality of said male elements and of
a corresponding plurality of said recesses arranged
so that each male element of a half-cage mates with
a recess facing said male element of the opposite
half-cage;

each pin projecting axially from a corresponding male
element consisting of one said solid block, so as to
be arranged axially in series with said solid block,
downstream of said solid block with respect to said
first frontal face of the annular body of each half-
cage; and each recess being arranged axially in series
with a respective said hole, upstream of said hole
with respect to said first frontal face of the annular
body of each half-cage.

2. The annular cage according to claim 1, wherein the
conjugate connection elements of said second pair of con-
nection elements are configured to receive tangential com-
ponents of mechanical stresses acting in use on the annular
cage, while the conjugate connection elements of said first
pair of connection elements are configured to receive axial
components of said mechanical stresses.

3. The annular cage according to claim 2, wherein each
said solid block constituting one said male element of said
second pairs of conjugate connection elements presents a
truncated-pyramidal shape, as well as each corresponding
said recess, so that the coupling between each solid block
and the corresponding recess is by means of surfaces
arranged obliquely to a common axis of symmetry of the
opposite half-cages.

4. The annular cage according to claim 3, wherein each
said solid block constituting one said male element of said
second pairs of conjugated connection elements is laterally
provided, in a circumferential direction, with respective
radial reliefs or teeth configured to snap-couple with respec-
tive radial grooves obtained within each said recess; or,
conversely, the radial grooves being machined laterally on
said solid blocks constituting said male elements of said
second pairs of conjugated connection elements and said
radial reliefs or teeth projecting circumferentially within
said recesses.

5. The annular cage according to claim 4, wherein each
said at least partially hemispherical cavity of each half-cage
is bounded on its respective opposite circumferential sides
by a first and a second axial lug, arranged adjacent to each
other, projecting axially from the annular body of each
half-cage, the first axial lug bearing in turn, axially project-
ing in series, one said male element consisting of said solid
block and one said pin and the second axial lug being
internally hollow and delimiting one said recess, from the
interior of which axially departs a respective said hole which
passes through the respective annular body until the hole
crosses through said second frontal face; the opposite cir-
cumferential sides of respective adjacent pairs of said at
least partially hemispherical cavities of the annular body of
each said half-cage flanking respective opposite side walls
of each said recess provided with said radial grooves, which
are configured to snappingly mate circumferentially with
said radial teeth or reliefs of the male elements or, con-
versely, provided with said radial teeth or reliefs which are
configured to snappingly mate circumferentially with said
radial grooves of the male elements.

6. The annular cage according to claim 5, wherein each
said at least partially hemispherical cavity of the annular
body of each half-cage is bounded axially, toward the second
frontal face of the annular body, by a spherical back wall
provided, toward the first frontal face of the annular body,
with a depression axially developing in depth toward the
second frontal face and having a circumferential extension,
configured to constitute a lubricating grease containment
chamber, so that in use, with the half-cages axially coupled,
respective opposite sides of each of said seats or pockets for
accommodating the rolling bodies are bounded by opposite
lubricating grease containment chambers that are directly in
contact with the rolling bodies at a median or primitive
diameter of the rolling bearing.

7. The annular cage according to claim 6, wherein said
spherical back wall of each of the at least partially hemi-
spherical cavities is provided with a pair of radial grooves
which are parallel to each other and are arranged close to
opposite circumferential sides of each at least partially
hemispherical cavity, configured to allow in use the circu-
lation of lubricating grease within each said rolling body
seat or pocket; and, in combination, said opposite circum-
ferential sides of each at least partially hemispherical cavity
are bounded on the side of said first frontal face of the
annular body by opposite chamfers configured to form, with
the half-cages axially coupled, opposite curved radial chan-
nels for lubricating grease circulation arranged peripherally
around each said seat or pocket for the rolling bodies.

8. The annular cage according to claim 7, wherein each
half-cage is provided radially on the outside thereof with a
first radial annular ridge formed in proximity to said second
frontal face of the annular body of each half-cage, so as to
be axially distal from the seats or pockets for the rolling
bodies; said first radial annular ridge of each half-cage being
configured to go to mate in use within an annular groove
obtained radially on the inside of the outer ring of the rolling
bearing to exert with the outer ring a labyrinth seal function;
a second radial annular ridge being optionally obtained
radially on the inside of each half-cage, substantially flush
with the first radial annular ridge, and being configured to go
to mate in use within a second annular groove obtained
radially on the outside of the inner ring of the rolling bearing
to exert with the inner ring a labyrinth sealing function.

9. The annular cage according to claim 8, wherein said
first radial annular ridge is provided radially on the outside
with an axial relief obtained spaced apart, radially on the inside, from a radially outer peripheral edge of the first ridge having in radial section a curved profile.

10. The annular cage according to claim 1, wherein each said solid block constituting one said male element of said second pairs of conjugated connection elements is laterally provided, in a circumferential direction, with respective radial reliefs or teeth configured to snap-couple with respective radial grooves obtained within each said recess; or, conversely, the radial grooves being machined laterally on said solid blocks constituting said male elements of said second pairs of conjugated connection elements and said radial reliefs or teeth projecting circumferentially within said recesses.

11. The annular cage according to claim 10, wherein each said at least partially hemispherical cavity of each half-cage is bounded on respective opposite circumferential sides by a first and a second axial lug, arranged adjacent to each other, projecting axially from the annular body of each half-cage, the first axial lug bearing in turn, axially projecting in series, one said male element consisting of said solid block and one said pin and the second axial lug being internally hollow and delimiting one said recess, from the interior of which axially departs a respective said hole which passes through the respective annular body until the hole crosses through said second frontal face; the opposite circumferential sides of respective adjacent pairs of said at least partially hemispherical cavities of the annular body of each said half-cage flanking respective opposite side walls of each said recess provided with said radial grooves that are configured to snappingly mate circumferentially with said radial teeth or reliefs of the male elements or, conversely, provided with said radial teeth or reliefs which are configured to snappingly mate circumferentially with said radial grooves of the male elements.

12. The annular cage according to claim 1, wherein each said at least partially hemispherical cavity of the annular body of each half-cage is bounded axially, toward the second frontal face of the annular body, by a spherical back wall provided, toward the first frontal face of the annular body, with a depression axially developing in depth toward the second frontal face and having a circumferential extension, configured to constitute a lubricating grease containment chamber, so that in use, with the half-cages axially coupled, respective opposite sides of each of said seats or pockets for accommodating the rolling bodies are bounded by opposite lubricating grease containment chambers that are directly in contact with the rolling bodies at a median or primitive diameter of the rolling bearing.

13. The annular cage according to claim 12, wherein said spherical back wall of each of the at least partially hemispherical cavities is provided with a pair of radial grooves that are parallel to each other, the pair of radial grooves being configured to allow in use the circulation of lubricating grease within each said rolling body seat or pocket; and each at least partially hemispherical cavity having opposite circumferential sides bounded on the side of said first frontal face of the annular body by opposite chamfers configured to form, with the half-cages axially coupled, opposite curved radial channels for lubricating grease circulation arranged peripherally around each said seat or pocket for the rolling bodies.

14. The annular cage according to claim 1, wherein each half-cage is provided radially on the outside thereof with a first radial annular ridge formed in proximity to said second frontal face of the annular body of each half-cage, so as to be axially distal from the seats or pockets for the rolling bodies; said first radial annular ridge of each half-cage being configured to go to mate in use within an annular groove obtained radially on the inside of the outer ring of the rolling bearing to exert with the outer ring a labyrinth seal function; a second radial annular ridge being optionally obtained radially on the inside of each half-cage, substantially flush with the first radial annular ridge, and being configured to go to mate in use within a second annular groove obtained radially on the outside of the inner ring of the rolling bearing to exert with the inner ring a labyrinth sealing function.

15. The annular cage according to claim 14, wherein said first radial annular ridge is provided radially on the outside with an axial relief obtained spaced apart, radially on the inside, from a radially outer peripheral edge of the first ridge having in radial section a curved profile.

16. A rolling bearing unit comprising:

a rolling bearing having an outer ring, an inner ring and a plurality of rolling bodies interposed between the inner and outer rings to make the inner and outer rings relatively rotatable with each other, and an annular cage retaining the rolling bodies and mounted interposed between the inner and outer rings; the annular cage comprising:

a plurality of pockets each bounded by a respective spherical surface having a center lying in a radial median plane of the cage coincident with a corresponding radial median plane of the rolling bearing;

two half-cages substantially symmetrical with respect to the median plane, and connected to each other, each half-cage presenting an annular body and a plurality of at least partially hemispherical cavities facing axially to the hemispherical cavities of the opposite half-cage to define the pockets; and connection elements associated with the half-cages to constrain the two half-cages together to form said annular cage; characterized by the fact that said connection elements include, in combination:

first pairs of conjugate connection elements consisting, for each first pair, of a pin at least partially elastically deformable and of a respective hole configured to receive the pin snappingly, each half-cage being provided with a plurality of said pins projecting axially from the annular body on the side of a first frontal face of the annular body and of a corresponding plurality of holes formed axially in the annular body on the side of a second frontal face thereof, opposite to the first frontal face, the annular body of each half-cage being provided with said holes and said pins that are arranged in such a way that each pin of said half-cage mates with the hole facing the pin of the opposite half-cage through an opening of the hole facing the first face; and second pairs of conjugate connection elements consisting, for each second pair, of a male element configured as a substantially rigid and solid block projecting axially from the first frontal face of the annular body of each half-cage, and of a corresponding recess configured to mate in integral manner with the solid block constituting the male element, the recess being obtained through the first frontal face of the annular body of each half-cage; each half-cage being provided with a plurality of said male elements and with a corresponding plurality of said recesses arranged so that each male element of said half-cage mates with said recess facing said male element of the opposite half-cage;

each pin projecting axially from a corresponding male element consisting of one said solid block, so as to be arranged axially in series with the one said solid block, downstream of the one said solid block with respect to said first frontal face of the annular body of each half-cage; and each recess being arranged axially in series with a respective said hole, upstream of said hole with respect to said first frontal face of the annular body of each half-cage;

each half-cage being provided radially on the outside with a first radial annular ridge formed in the vicinity of said second frontal face of the annular body of each half-cage, so as to be axially distal from the seats or pockets for the rolling bodies; said first radial annular ridge of each half-cage mating within an annular groove obtained radially on the inside of the outer ring of the rolling bearing to exert a labyrinth seal function with the outer ring; a second radial annular ridge being optionally obtained radially on the inside of each half-cage, substantially flush with the first radial annular ridge, and coupling within a second annular groove optionally obtained radially on the outside of the inner ring of the rolling bearing to exert with the inner ring a labyrinth sealing function.

*    *    *    *    *